(12) United States Patent
Merchant et al.

(10) Patent No.: US 12,413,975 B2
(45) Date of Patent: Sep. 9, 2025

(54) SYSTEMS AND METHODS FOR STIR-SHAKEN ATTESTATION USING SPID

(71) Applicant: PINDROP SECURITY, INC., Atlanta, GA (US)

(72) Inventors: Mohammedali Merchant, New York, NY (US); Yitao Sun, New York, NY (US)

(73) Assignee: Pindrop Security, Inc., Atlanta, GA (US)

( * ) Notice: Subject to any disclaimer, the term of this patent is extended or adjusted under 35 U.S.C. 154(b) by 378 days.

(21) Appl. No.: 18/117,134

(22) Filed: Mar. 3, 2023

(65) Prior Publication Data

US 2023/0284016 A1 Sep. 7, 2023

Related U.S. Application Data

(60) Provisional application No. 63/316,736, filed on Mar. 4, 2022.

(51) Int. Cl.
*H04W 12/06* (2021.01)
*H04W 12/069* (2021.01)
*H04W 12/40* (2021.01)
*H04W 12/72* (2021.01)

(52) U.S. Cl.
CPC ......... *H04W 12/069* (2021.01); *H04W 12/40* (2021.01); *H04W 12/72* (2021.01)

(58) Field of Classification Search
CPC .... H04W 12/069; H04W 12/72; H04W 12/40
See application file for complete search history.

(56) References Cited

U.S. PATENT DOCUMENTS

2021/0352478 A1* 11/2021 Hauser ............... H04W 12/068

\* cited by examiner

*Primary Examiner* — Curtis B Odom
(74) *Attorney, Agent, or Firm* — Foley & Lardner LLP

(57) ABSTRACT

Embodiments described herein provide for evaluating call metadata and certificates of inbound calls for authentication. The computer identifies a service provider indicated by the SPID and/or the ANI (or other identifier) of the metadata and identifies a service provider indicated by the SPID and/or ANI (or other identifier) of the certificate, then compares identities of the service providers and/or compares the data values associated with the service providers (e.g., SPIDs, ANIs). Based on this comparison, the computer determines whether the service provider that signed the certificate is first-party signer (e.g., carrier) for the ANI or a third-party signer that is signing certificates as the first-party signer for the ANI.

20 Claims, 3 Drawing Sheets

SYSTEMS AND METHODS FOR STIR-SHAKEN ATTESTATION USING SPID

CROSS-REFERENCE TO RELATED APPLICATIONS

This application claims priority to U.S. Provisional Application No. 63/316,736, filed Mar. 4, 2022, which is incorporated by reference in its entirety.

This application relates to U.S. patent application Ser. No. 16/992,789, entitled "Caller Verification via Carrier Metadata," filed Aug. 13, 2020, which is incorporated by reference in its entirety.

TECHNICAL FIELD

This application generally relates to systems and methods for intelligent, automated detection of fraudulent or spoofed telephone calls using call metadata and certificate data associated with the telephone calls.

BACKGROUND

Spoofing techniques, such as caller ID spoofing and voice spoofing, can cause problems for enterprise call centers trying to maintain privacy by circumventing technological controls protecting customers' personal information. Call centers or third-party authentication services typically reference known information about customers (e.g., customer phone number, automatic number identification (ANI) of the customer) or customer attributes (e.g., voice attributes) to verify that a caller is a registered customer. Spoofing frustrates the enterprise's ability to leverage the stored knowledge about customers (e.g., stored customer ANI) with confidence. It would be beneficial to develop anti-fraud or call verification processes that are not susceptible to spoofed or manipulated data associated with phone calls.

New technologies intend to restore trust in telephone networks' capacity to identify callers or caller devices as non-fraudulent or genuine callers, such as Secure Telephony Identity Revisited (STIR) and Secure Handling of Asserted Information Using Tokens (SHAKEN) (sometimes collectively referred to as "STIR-SHAKEN"). STIR-SHAKEN allows carriers to digitally sign calls using digital certificates, thereby allowing a carrier to attest that a particular call handled by the carrier is genuine. The attestation level is tiered, indicating a level of relationship between the carrier and the caller and a level of confidence that the carrier has in determining whether the call could be a spoofed call. For example, attestation level A indicates that the carrier fully attests to the caller's privilege to use a particular phone number or ANI. In this example, the carrier may attest that the caller is a customer of the carrier and the caller is making the phone call using the carrier's network. In attestation level B, the carrier attests that the caller is a customer of the carrier, but the carrier is uncertain whether the caller has the right to use the phone number or other uncertain about other metadata information associated with the call. In attestation level C, the carrier is merely functioning as a pass through, transit network for the call, so the carrier is unwilling to assign confidence to any data associated with the call.

A problem with this STIR-SHAKEN technology is that metadata header information of calls often indicates that carriers are fully attesting (i.e., certifying calls at attestation level A) to spoofed calls originating from the carriers' networks. What is needed is a means for identifying whether a call is spoofed within the telecommunications systems implementing the STIR-SHAKEN technology.

SUMMARY

Disclosed herein are systems and methods capable of evaluating signaling metadata, including SIP messaging data and certificates, of inbound calls to determine, for example, whether to authenticate the call, whether purported caller and carrier identifiers are genuine or spoofed, or other determinations about the inbound call. A computer associated with a called party or call analytics service may receive SIP header data and the certificate for the inbound call and evaluates a field in the certificate called the Service Profile Identifier (SPID) (sometimes called a "Service Provider Identifier"), a SPID of the SIP data, and an ANI (or other identifier) associated with the incoming caller in the SIP data. Embodiments may use any type of telecom service provider identifier, such as an Operating Company Number (OCN), in addition or as an alternative to the SPID. The computer may identify a service provider indicated by the SPID and/or the ANI of the SIP data by querying one or more databases and identify a service provider indicated by the SPID and/or ANI of certificate data by querying a certificate authority or other verification service. The computer then compares identities of the service providers and/or compares the data values associated with the service providers (e.g., SPIDs, ANIs). Based on this comparison, the computer may delineate between a first-party signer versus a third-party service provider (e.g., intermediary pass-through service provider, third-party cloud communication service provider) that is signing as the first-party in the first-party's calls. The computer verifies the SPID-ANI information associated with the inbound call where the SPID and/or ANI information in the SIP data matches or otherwise corresponds to the SPID information in the certificate data. The computer then references the verification outcome for the SPID-ANI information to determine whether to authenticate the call or for any number of additional or alternative determinations. In some embodiments, the computer can assess the SPID-ANI information using other identifiers for the inbound call in addition or as an alternative to the ANI, such as a network number or billing number associated with a caller.

The computer may execute any number downstream operations to generate various scored evaluations based upon the SPID verification determination and the signaling metadata for the inbound call. The downstream operations include rules-based algorithms, machine-learning architectures, or both that take the signaling metadata or previous determinations as inputs or weights. Non-limiting examples of such evaluations that the computer generates include a verification score for the SPID-ANI information, an authentication score for the inbound call, a spoof likelihood score based upon the signaling metadata of the inbound and/or behavior features observed from similar signaling metadata, and a reputation score for the SPID based upon behavior features observed for the SPID, among others.

In some embodiments, a computer-implemented method comprises receiving, by a computer, signaling metadata for an inbound call indicating an Automated Number Identification (ANI) and a first Service Profile Identifier (SPID) associated with the ANI, and a certificate indicating a second SPID and an attestation level for the inbound call; identifying, by the computer, a first provider indicated by the first SPID and a second provider indicated by the second SPID by querying a certificate authentication database; determining, by the computer, a signer-level of the second provider for the inbound call based upon comparing the first provider identified by the first SPID and the second provider identified by the second SPID; and generating, by the computer, an authentication score for the inbound call based upon the attestation level and the signer-level.

In some embodiments, a system comprises a computer coupled to a telecommunications system and comprising a processor configured to receive signaling metadata for an inbound call indicating an Automated Number Identification (ANI) and a first Service Profile Identifier (SPID) associated with the ANI, and a certificate indicating a second SPID and an attestation level for the inbound call; identify a first provider indicated by the first SPID and a second provider indicated by the second SPID by querying a certificate authentication database; determine a signer-level of the second provider for the inbound call based upon comparing the first provider identified by the first SPID and the second provider identified by the second SPID; and generate an authentication score for the inbound call based upon the attestation level and the signer-level.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
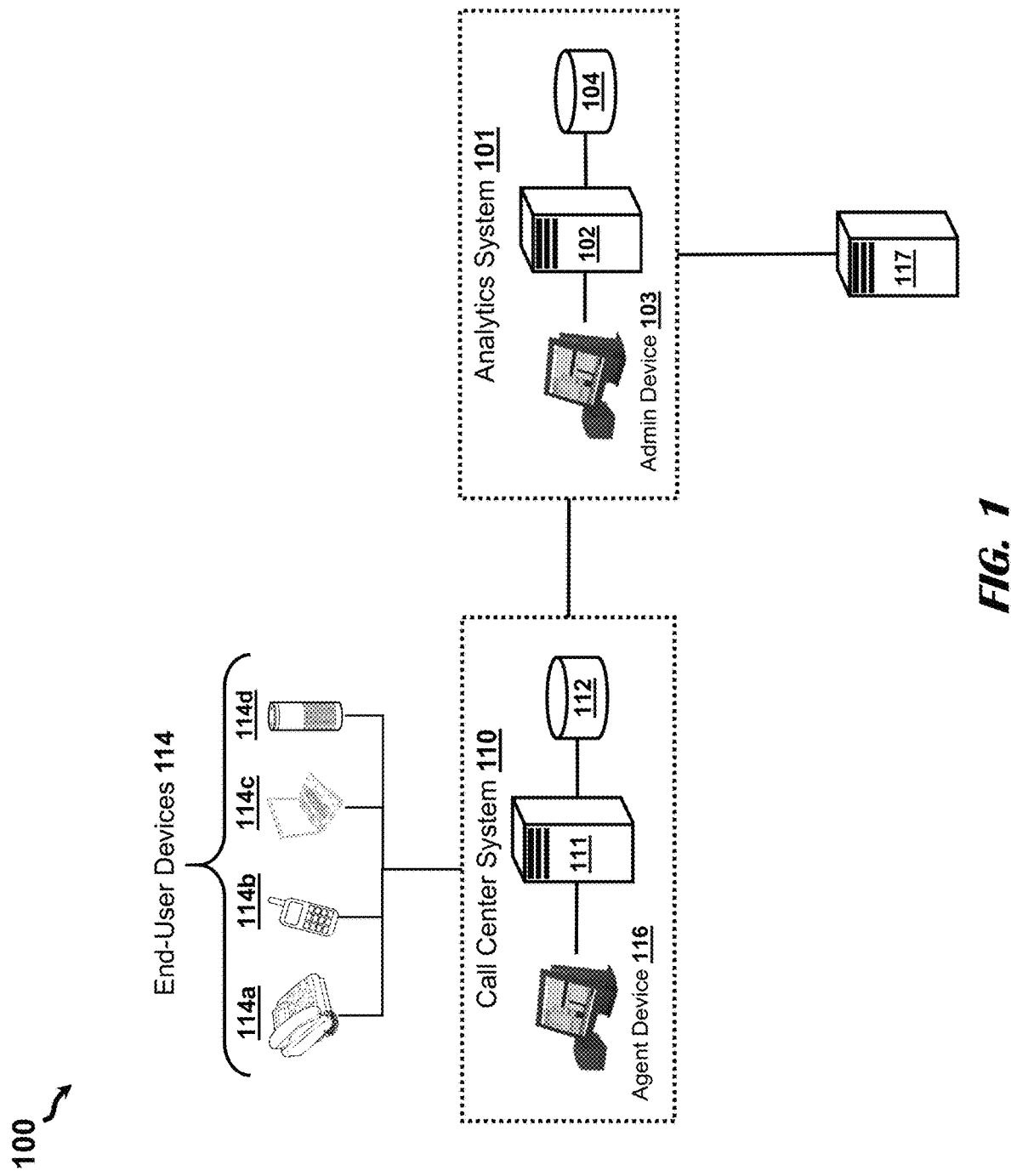
FIG. 1 shows components of a system for receiving and servicing inbound calls, according to an example embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for authenticating calls within a telecommunications environment in which carriers or other telephony services providers assign certificates, such as SSL certificates, to calls. The carrier uses a certificate to attest to a level of relationship or privity with a call using a particular ANI and a level of confidence that the call using the ANI is spoofed or genuine, as purported by the caller and the call data. The types or levels of attestations may include "level A" (sometimes referred to as "full attestation"), "level B" (sometimes referred to as "partial attestation"), and "level C" (sometimes referred to as "gateway attestation" or "pass through attestation"). Data fields of the certificates contain data representing the attestations. A computer or other device of a carrier generates or otherwise assigns the attestation data and certificate to the call when the call enters the carrier's telecommunications network. The called party or telephony service or carrier of the called party receives the certificate in the metadata of the call and confirms the attestation by validating the certificate with a certificate authority. The problem is that sometimes the call metadata indicates that the carrier fully attested to the call or the carrier fully attests to the call, even when the call is a spoofed call.

To address this problem, a computer associated with the called party can evaluate one or more types of identifiers for telecom service providers, such as the SPID or the OCN, found in the SIP header data or in a field of a certificate attesting to a level of privity with the calling party. For instance, the computer associated with the called party can evaluate a field in the certificate called the SPID associated with the ANI of an incoming caller. The computer can compare the SPID of the ANI of incoming caller according to another data source against the SPID associated with the ANI according to the certificate. Based on this comparison, the computer may delineate between a first-party signer (e.g., Verizon®, AT&T®) versus a third-party or intermediary service provider that is signing the first party signer's calls. For instance, an end-user could sign-up for an account with a third-party cloud-communication service (e.g., Twilio®, Bandwidth®) and configure the communication service to trust the end-user's calls. As such, the cloud-communication will trust calls originating from the end-user's devices, even if the end-user is spoofing the ANI. Due to the relationship between the carrier and the cloud-service, the carrier will assign the attestation level A to the end-user's calls, even if the end-user is spoofing the ANI. A called party would receive and validate the call having full attestation. However, if the called party's computer examined portions of the certificate (e.g., SPID field), then the called party's computer would determine that the signer of the call was not actually the carrier. Rather, the signer was the cloud-communication service. In such cases, the called party's computer could determine to decline the call, associate the call with metadata indicating the call is untrusted, or otherwise perform one or more downstream operations for untrusted calls.

For ease of understanding and describing example embodiments, embodiments described herein make reference to using the SPID, though embodiments are not limited to evaluating the SPID. Embodiments may employ any type of telecom service provider identifier, such as the SPID or the OCN.

Furthermore, embodiments are not limited to evaluating the purported ANI of an inbound call. When confirming whether the SPID of the inbound call's certificate is associated with a first-party signer (e.g., Verizon® carrier, AT&T® carrier) or third-party service (e.g., Twilio®), the called party's computer can evaluate other types of identifiers for the end-user device, in addition or as an alternative to evaluating the ANI of the end-user device. For example, in some jurisdictions, telecommunications standards implementing STIR-SHAKEN rely on the certificate as a representation of a telecommunication provider attesting to the purported ANI. In other jurisdictions, the telecommunications standards implementing STIR-SHAKEN might rely on the certificate as a representation of a telecommunications provider attesting to another type of identifier, such as a network number, a billing number, a device identifier (e.g., SIM card), carrier identifier, or other types of identifying information associated with the header or metadata of a call.

FIG. 1 shows components of a system 100 for receiving and servicing inbound calls according to an embodiment. The system 100 comprises an analytics system 101, call center systems 110 of customer enterprises (e.g., companies, government entities, universities), and end-user devices 114. The analytics system 101 includes analytics server 102, analytics database 104, and admin device 103. The call center system 110 includes call center servers 111, call center databases 112, and agent device 116. The system 100 describes an embodiment of call authentication performed by the analytics system 101 on behalf of the call center system 110.

Embodiments may comprise additional or alternative components or omit certain components from those of FIG. 1, and still fall within the scope of this disclosure. It may be common, for example, for the system 100 to include multiple call center systems 110 or for the analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 is integrated with the analytics server 102. Moreover, FIG. 1 shows a single analytics server 102, though the analytics server 102 may include any number of computing devices operating in a distributed computing or cloud-computing environment. In some embodiments, functions of the analytics server 102 may be partly or entirely performed by the computing devices of the call center system 110 (e.g., the call center server 111).

The various components of the system 100 are interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The system 100 comprises various hardware and software components that capture and store various types of call data, including audio data or other signaling data related to the call received at the call center system 110. The call data may include, for example, audio data (e.g., audio recording, audio segments, low-level spectro-temporal features, acoustic features), caller information (e.g., an ANI, customer identifiers of customers of the call center system 110, caller name, caller address, etc.), and metadata (e.g., JIPs, CLLIs, protocol headers, device identifiers) related to particular software (e.g., Skype®, codecs) and protocols (e.g., TCP/IP, SIP, SS7) used to execute the call via the particular communication channel (e.g., landline telecommunications, cellular telecommunications, Internet).

The end-user devices 114 may be any communications or computing device that the caller operates to access the services of the call center system 110 through the various communications channels. For instance, the end-user may place the call to the call center system 110 through a telephony network or through a software application executed by the end-user devices 114. Non-limiting examples of end-user devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The end-user devices 114, however, are not limited to the telecommunications-oriented devices or channels. For instance, in some cases the mobile phones 114b may communicate via a computing network channel (e.g., the Internet). The end-user devices 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for computing network communications. The edge device 114d could be any smart device capable of executing software applications and/or performing voice interface operations. Non-limiting examples of the edge device 114d may include voice assistant devices, automobiles, smart appliances, and the like.

Generally, when a caller places the call to the call center system 110, the end-user device 114 instructs components of a telecommunication carrier system or other network routing system to originate and connect the current call to the call center system 110. When the inbound call is established between the end-user device 114 and the call center system 110, a computing device of the call center system 110, such as a call center server 111 or agent device 116 forwards the inbound call and any associated signaling metadata to the analytics system 101 via one or more computing networks.

The end-user device 114 may access, and place calls using, a third-party cloud-communication service (e.g., Twilio®, Bandwidth®). As with similar VoIP services, the calls may employ a VoIP data streaming protocols as well as protocols for telephony networks. The cloud-communication service may transmit the VoIP calls over one or more networks, where the VoIP calls include metadata associated with telephony-based calls as well as metadata associated with Internet traffic. For instance, the metadata of an outgoing call from the cloud-communication service indicates the ANI and includes a certificate fully attesting to the trustworthiness that the ANI originated from the end-user's actual telecommunications carrier and is not spoofed. A server (not shown) of the cloud-communication service signed the call using a certificate uniquely assigned to the cloud-communication service by a third-party certificate authority service hosting certificate repository 117.

The call center system 110 is operated by a particular enterprise to offer various services to the enterprise's end-users (e.g., customers, account holders). The call center system 110 includes a call center server 111 or other computing device that executes various operations related managing the inbound calls. These operations include receiving or generating various forms of call data, and forwarding the call data to the analytics system 101.

The call center server 111 of a call center system 110 executes software processes for managing a call queue and/or routing calls made to the call center system 110, which may include routing calls to the appropriate call center agent devices 116 based on the inbound caller's comments, instructions, interactive voice response (IVR) inputs, or other inputs submitted during the inbound call. The call center server 111 can capture, query, or generate various types of call data (e.g., audio data, audio recording, metadata, speaker inputs) about the call, the caller, and/or the end-user device 114 and forwards the call data to the agent device 116. An agent user interface (UI) generated by software executed by the agent device 116 displays the call data to a call center agent.

The call center server 111 also transmits the captured, queried, or generated types of call data to the analytics server 102 (or other device) of the analytics system 101, which performs the various analytics processes on the call data of the inbound call and/or prior calls. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS). The analytics database 104 and/or call center database 112 may also store various models and threshold configurations for machine-learning architectures used in downstream operations, such as evaluating a confidence or risk score associated with inbound calls. The analytics server 102 may automatically tune the thresholds or models according to machine-learning techniques executed by the analytics server 102. The analytics server 102 determines thresholds based on prior call data metadata and/or prior call authentication results for prior calls. In some configurations, the agents or administrators enter the thresholds or model configurations using the agent device 116 or the admin device 103.

Servers of a certificate repository 117 include an external database and perform certificate authority functions as hosted by a third-party certificate authority or other telephony service offering an administrative or overhead service of the nationwide or global telecommunications system. The third-party telephony service may provide a directory or telecommunications data service that hosts the external database assigning, storing, validating, revoking, or otherwise managing certificates, as well as storing a variety of types of data associated with any number of entities or people.

The analytics server 102 may query the certificate repository 117 according to the certificate and other information received from the end-user devices 114 during telephone calls, such as an ANI or SPID received with the inbound call or the ANI or SPID indicated by the certificate received with the inbound call. The information returned by the certificate authority 117 (or other external telephony service) may be, for example, the SPID for the purported ANI of the inbound call, among various information known to be (by registration) or otherwise frequently associated with the ANI and/or SPID. For example, in some embodiments the analytics server 102 may utilize the match determination (e.g., determination that the purported SPID or ANI in the certificate matches with the ANI or SPID of a carrier first-party signer) or mismatch determination as a mere factor in call authentication processing, among other factors that must together satisfy a risk score threshold before a machine-learning architecture executed by the analytics server 102 will determine that the call is trusted and not fraudulent.

The admin device 103 of the analytics system 101 is a computing device allowing personnel of the analytics system 101 to perform various administrative tasks or an administrator prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the administrator employs the admin device 103 to configure the operations of the various components of the analytics system 101 or call center system 110 and to issue queries and instructions to such components. In an example, an administrator using the admin device 103 determines one or more thresholds used in authenticating inbound calls.

The agent device 116 of the call center system 110 may allow agents or other users of the call center system 110 to configure operations of devices of the call center system 110. The agent device 116 may be any computing device comprising a processor and software, and capable of performing the various tasks and processes described herein. Non-limiting examples of the agent device 116 may include a server, personal computer, laptop computer, tablet computer, or the like. For calls made to the call center system 110, the agent device 116 receives and displays via the agent UI some or all of the information associated with inbound call data, routed from the call center server 111 or from the analytics server 102. The agent UI further permits the agent to provide call authentication feedback to the analytics server 102.

The analytics service 101 operates the analytics server 102 to perform various call analytics operations on behalf of the enterprise's call center system 110. The analytics operations include, for example, verifying the certificate information received with the inbound calls and call authentication for inbound calls. An enterprise organization (e.g., corporation, government entity, university) that services end-users operates the call center system 110 to service calls or web-based interactions with the end-users via the various communication channels. The analytics system 101 and the call center system 110 represent network infrastructures 101, 110 comprising physically and logically related software and electronic devices managed or operated by various enterprise organizations. The devices of each network system infrastructure 101, 110 are configured to provide the intended services.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110.

The analytics server 102 executes data analysis and audio-processing software that includes machine-learning (or artificial intelligence) software routines to analyze the call data of the inbound call. Non-limiting examples of such audio-processing operations may include ingesting the inbound call (including pre-processing an input audio signal of the inbound call), automatic speaker verification (ASV), speaker recognition, speaker verification, and generating enhanced audio signals for a certain targeted speaker, among any number of additional or alternative operations. Non-limiting examples of the pre-processing operations executed on the input audio signals include parsing or segmenting the input audio signal into frames or segments (e.g., speech segments of a given length, non-speech segments of a given length), performing one or more transformation functions (e.g., FFT, SFT), and extracting various types of features from the input audio signal, among other potential pre-processing operations.

For embodiments in which the analytics server 102 executes machine-learning algorithms, the analytics server 102 uses labeled data stored in the analytics database 104 or call center database 112 in order to train or otherwise generate one or more machine-learning architectures. Training machine learning models is described in U.S. patent application Ser. No. 16/992,789, entitled "Caller Verification via Carrier Metadata," filed Aug. 13, 2020 ("the '789 Application"), which is incorporated by reference in its entirety. Labeled data may indicate which call data are associated with fraudulent calls and which are associated with non-fraudulent calls. The analytics server 102 may reference such labels when training machine-learning models. The machine-learning architectures executed by the analytics server 102 may evaluate the metadata of the inbound calls and/or the speaker audio signal of the inbound calls to determine a risk score for the inbound calls.

The analytics server 102 queries the certificate repository 117 (or analytics database 104) to determine whether the SPID and ANI in the certificate of the inbound call match the SPID and ANI expected for the particular inbound call and/or determine whether the SPID of the certificate indicates the call originated from a first-party signer or third-party service. In operation, the analytics server 102 may query the certificate repository 117 using the SPID or the ANI in the certificate or SIP header information to determine whether the first-party service (i.e., the carrier registered as the telecommunication service responsible for the purported ANI) actually signed the certificate or whether an intermediary service provider (e.g., cloud-communication service provider) signed the certificate. The analytics server 102 outputs an indication of match or mismatch and may also output an indication of each SPID (e.g., SPID in the certificate, expected SPID registered with the ANI of the inbound call). In some embodiments, the analytics server 102 may receive the SPID-match determination as a binary input, in which the analytics server 102 determines the inbound call is either untrusted or trusted according to the SPID-match determination. In some embodiments, the analytics server 102 may feed the match determination into the downstream machine-learning architecture operations, in which the SPID-match determination is ingested as a factor into the layers of the machine-learning architecture that evaluate the metadata associated with the inbound calls.

The analytics server 102 need not be limited to querying or evaluating the purported ANI of an inbound call. For instance, in some circumstances the first-party signer or intermediary service provider may assign a certificate to the inbound call attesting to another purported identifier (e.g., network number) associated with the end-user device 114. When confirming whether the SPID of the inbound call's certificate is associated with a first-party signer (e.g., carrier) or third-party service (e.g., Twilio®), the analytics server 102 computer can evaluate other types of identifiers for the end-user device, in addition or as an alternative to evaluating the ANI of the inbound call. Non-limiting examples of other types of identifiers include a network number, billing number, a device identifier (e.g., SIM card), carrier identifier, or any other type of identifying information associated with the header or metadata of the inbound call or end-user device 114.

The analytics server 102 may execute various software-based processes that, for example, ingest call data (including metadata and an ANI) of telephone calls, query one or more databases 104, 112, or other external database, determine an authentication status of the metadata based on prior call data or prior calls, and determine a risk score of a current inbound call to a call center 110 using probability data based on prior call data of prior calls. The metadata includes, for example, the SPID of the inbound call, the ANI of the inbound call, the SPID-ANI pair of the certificate received with the inbound call, or the SPID-match determination for the particular ANI.

In some implementations, the analytics server 102 identifies or determines authentication factors as values or features using the call metadata, and references these authentication factors for authenticating an inbound call. The authentication factors may include, for example, the SPID-match determination for the purported SPID of the certificate (e.g., whether the SPID of certificate matches to a first-party signer or third-party service). For instance, the analytics server 102 determines that the SPID-ANI pair in the certificate is associated with a first-party signer, the analytics server 102 references this SPID-match determination as an authentication factor used as an input to one or more machine-learning architecture algorithms for authenticating the particular call.

Non-limiting examples of authentication factors may include acoustic features extracted from the audio signal of the inbound call (e.g., mel-frequency cepstrum coefficients (MFCCs)); behavior features of the caller during the call (e.g., an action taken during interaction with an IVR system; an amount of time elapsed between actions taken during interaction with an IVR system; identifying incorrect information to an IVR system; a number of times a specific activity in an IVR was performed; a number of times an IVR was called during a measure of time; a volume or a duration of at least one dual-tone multi frequency (DTMF) tone during interaction with an IVR system; an amount of time elapsed between DTMF tones, a use of voice during interaction with an IVR system, an amount of time elapsed between a beginning of an IVR prompt and a caller's spoken response to the IVR prompt, or an amount of time elapsed between an IVR prompt and an action taken during interaction with an IVR system); velocity features of the call (e.g., a sequence of calls or attempted calls from at least one ANI similar to the inbound ANI, account identifiers, etc.); reputation features of the call (e.g., suspicious activity, malicious activity, a prior complaint, a device type, a carrier, a route taken by the call prior to entering a telephone exchange, a route taken by the call after leaving a telephone exchange, or a location) and the like.

As an example, in some cases, the analytics server 102 includes a machine-learning architecture that executes a location model according to any number of machine-learning techniques (e.g., Bayesian model, random forest, neural network) trained to predict the likelihood of receiving a purported JIP for a given CLLI or location. In some cases, a machine-learning model in the layers of the machine-learning architecture implements an ensemble model, defined by a plurality of constituent models trained to generate the predicted outcome in concert. As an example, the location model implements three constituent models, each of which implements distinct machine-learning techniques to predict the likelihood of receiving the purported JIP for the given CLLI or location. These are merely examples and not intended to limit potential embodiments of the machine-learning architecture(s) within the scope of this disclosure. The analytics server 102 determines whether the risk score or other scoring output (e.g., predicted authentication score) satisfy corresponding thresholds (e.g., risk threshold for predicting a likelihood of fraud risk detection; authentication threshold for predicting a likelihood that the caller or calling device 114 should be authenticated as a purported registered caller or registered calling device 114). The analytics server 102 calculates and evaluates the one or more outputted scores when applying the various statistical or operational layers (e.g., scoring layers, fully-connected layers, stat pooling layers) of the machine-learning architecture on the various types of signaling data or other types of call data. Additional examples of such embodiments may be found in U.S. patent application Ser. No. 18/109,095, filed Feb. 13, 2023, which is incorporated by reference in its entirety.

In some embodiments, the analytics server 102 uses the SPID-match determination as an authentication factor by inputting the authentication factors (including the SPID-match determination) in the machine-learning architecture, and/or increasing a confidence score output by the machine-learning architecture.

The analytics server 102 uses the authenticated SPID-match determination as an authentication factor input into the machine-learning architecture. The analytics server 102 uses the machine-learning model to predict the probability (represented as a risk score) that the call is spoofed or otherwise fraudulent. Additionally or alternatively, the machine-learning model may predict the probability (represented as the risk score) that the call originated from a verified or expected calling device. The server may execute a machine-learning algorithm that applies a trained machine-learning model on the authentication factors associated with the inbound phone call. Applying the machine-learning model may be accomplished according to the particular machine-learning algorithm used, such as a random forest, SVM, or similar machine-learning algorithms. The output of the machine-learning model may be the risk score for the inbound phone call, as calculated based upon the authentication factors of the inbound call and, for example, weights assigned to each value of the authentication factors according to the machine-learning model. Example embodiments for feeding call data, including metadata, into a machine-learning architecture and determining a risk score from such inputs is further described in the '789 Application, which has been incorporated by reference.

The analytics server 102 determines whether the risk score, as calculated from applying the machine-learning model, satisfies a predetermined authentication threshold. When the analytics server 102 determines the risk score satisfies the threshold, then the analytics server 102 determines that the analytics server 102 has identified an authenticated inbound call. Alternatively, when the analytics server 102 determines the risk score fails to satisfy the threshold, then the analytics server 102 determines that the server has identified the current inbound call is a spoofed call having spoofed identifying information (e.g., spoofed ANI).

In some implementations, the analytics server 102 may take certain actions based upon the calculated risk score and/or based upon the results of the SPID-match determination. If the risk score satisfies a certain risk threshold or if the SPID-ANI pair of the certificate does not correspond to a first-party signer, the analytics server may determine that the current call is a fraudulent. The analytics server 102 may generate a notification for display on a graphical user interface (GUI) of a computing device of an agent device 116 at a customer call center 110 or an admin device 103. The analytics server 102 may also end or reject the call, store the metadata for the call into one or more databases 104, 112, or forward the call to a fraud analyst for various remedial measures.

Figure 2:
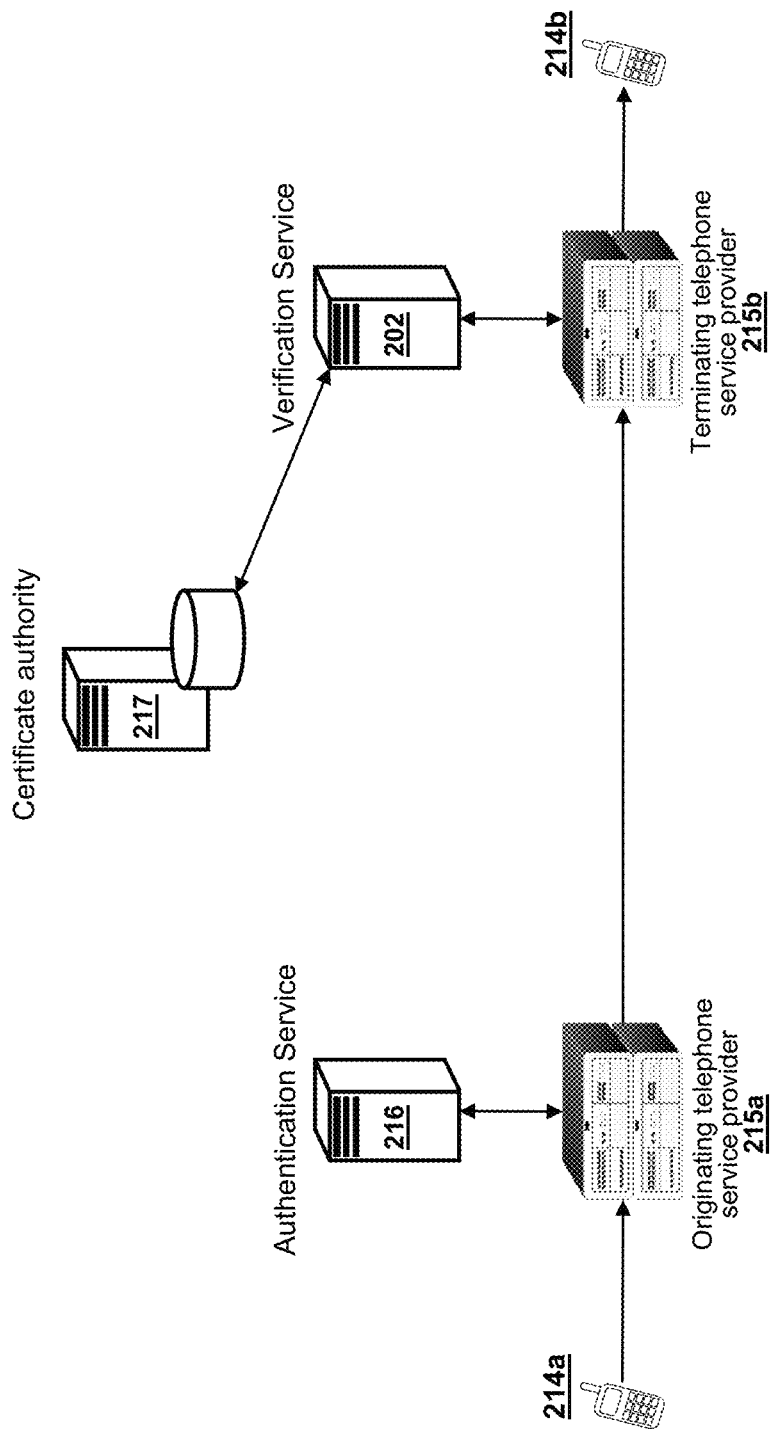
FIG. 2 is a diagram showing data flow of receiving and servicing inbound calls among various devices, according to an embodiment.

FIG. 2 is a diagram showing data flow of receiving and servicing inbound calls among various devices, according to an embodiment. The devices may include a caller device 214a that initiates a call to a called device 214b (collectively referred to as end-user devices 214). The call is handled by the devices of an originating telephony service provider 215a and the devices of a terminating telephony service provider 215b (collectively referred to as telephony service providers 215), where the call may be routed and by the devices of any number of intermediate transit service providers 215.

An authentication server 216 performing an authentication service assigns a certificate to the call that attests that the call is not spoofed and genuine, where the authentication service may be a computing function hosted by devices (e.g., authentication server 216) of the originating telephony service provider 215a or performed by a third-party cloud-communication service provider. A verification server 202 of a verification service may validate the purported attestation level of the call using the certificate associated with the call, where the verification service is a computing function hosted by devices (e.g., verification server 202) of the terminating telephony service provider 215b or third-party analytics service on behalf of the terminating telephony service provider 215b or the called device 214b. In some embodiments, the verification server 202 performs additional functions to determine the risk level associated with the call (similar to the analytics server 102 of FIG. 1). The verification server 202 queries a certificate authority 217 or other database (e.g., certificate repository) to determine whether a first-party signer (e.g., originating telephony service provider 215a) attested to the call or whether a third-party telecommunications service (e.g., cloud-communication service) attested to the call.

The telephone service providers 215 (including the originating telephone service provider 215a and the terminating telephone service provider 215b) route the call 214 to the called device 214b. In some cases, the telephone service providers 215 inject and/or alter metadata or other call data during the routing of the call 214.

Telephony service providers 215 that terminate calls on telecommunications and/or IP networks, such as the originating telephony service provider 215a, are responsible for verifying the calls by executing a verification service. This may include the verification server 202 of the terminating telephony service provider 215b or of a third-party analytics service. The terminating telephony service provider 215b verifies the call by checking the format and content (e.g., SPID, certificate header, SIP header, ANI) to verify the certificate of the originating telephony service provider 215a.

Generally, there are two methodologies of implementation the certificates—in-band and out-of-band. For in-band evaluations, a call "invite" message carries the certificate with identity (SPID) header metadata. For out-of-band evaluations, the caller device 214a and originating telephony service provider 215a send a call "invite" to the terminating telephony service provider 215b and called device 214b. The originating telephony service provider 215a will sign the call "invite" with a certificate using the certificate received from the certificate authority 217. The verification server 202 of the terminating telephony service provider 215b will query the certificate authority 217 to determine the validity of the certificate.

The verification server 202 checks the format and contents of the identity header to ensure the required parameter are present and contains a value (i.e., not null). For instance, the verification server 202 may checks that the date and time indicated in a "time" parameter is not earlier than 60 seconds prior to the time that verification server 202 performs the verification functions. In some cases, the verification server 202 may ensure the certificate or header information contains accurate information. For instance, the verification server 202 may compare the telephone number in "destination" and "originator" parameters with the telephone numbers in the "To" and "From" header fields.

To validate the certificate of the originating telephony service provider 215a, the verification server 202 or terminating telephony service provider 215b acquires and assesses the validity of the certificate belonging to the originating telephony service provider 215a. The verification server 202 transmits a request for the certificate to a certificate authority 217 of the originating telephony service provider 215a and receives a copy of the current certificate. The verification server 202 then ensures that the certificate is currently valid based upon, for example, an expiration date and time have not passed, the issuing certificate authority 217 is currently valid according to a list of approved certificate authorities stored in a database of the verification server 202, or based on verifying the signature of the certificate authority 217 on the certificate of the 215a with the public key of the certificate authority 217.

If the verification server 202 verifies the certificate of the originating telephony service provider 215a, then the verification server 202 extracts the public key from the certificate to verify the signature of the originating telephony service provider 215a. In this way, the verification server 202 may evaluate the signature to determine whether a device or telephony service provider 215 or provide altered the call information of the call's SIP "Invite" message in transit. For example, the verification server 202 may compute a hash value using various types of information from the header and/or certificate information, then the verification server 202 executes various validation algorithms using the public key, hash value, and other inputs from data received from the originating telephony service provider 215a to compute an expected hash value. The verification server 202 determines whether the computed hash value matches the expected hash value.

In addition to validating and verifying the certificate and signature of the originating telephony service provider 215a, the verification server 202 may further confirm that the originating telephony service provider 215a actually signed the call using the certificate of the originating telephony service provider 215a, and not a third-party cloud-communication service. In operation, the verification server 202 may receive and review a SPID value in the certificate of the call and the associated ANI of the call. The verification server 202 determines whether the SPID of the certificate of the call matches to the expected SPID for the particular ANI. The verification server 202 may query any number of data sources using the ANI of the call to identify other instances in which the originating telephony service provider 215a received the particular ANI in conjunction with the particular SPID.

In some implementations, the verification server 202 may use the ANI of the call to query the certificate authority 217 of the originating telephony service provider 215a expected for the particular caller device 214a. For instance, the ANI of the call, stored information about the caller, or other metadata of the call, may suggest to the verification server 202 that the call originated from a particular carrier service provider. Using the ANI of the call, the verification server 202 may query the certificate authority 217 of the expected carrier service provider to request the SPID expected to be associated with the ANI. If verification server 202 determines that the received SPID-ANI pair (of the certificate of the call) matches to the expected SPID-ANI pair (in the records of the certificate authority 217 of the expected carrier service provider), then the verification server 202 determines that the originating telephony service provider 215a is indeed the expected carrier service provider. If however, the verification server 202 determines that the received SPID-ANI pair (of the certificate of the call) does not match to the expected SPID-ANI pair (in the records of the certificate authority 217 of the expected carrier service provider), then the verification server 202 determines that the originating telephony service provider 215a is not the expected carrier and likely a third-party telephony service.

In some embodiments, the verification server 202 may query other types of data sources, in addition or as an alternative to the certificate authority 217. For instance, the verification server 202 may implement various APIs to query third-party identity services (e.g., TransNexus®) that maintain databases of telecommunications data that function as repositories of various types of information. The verification server 202 may transmit a query for the expected SPID based on the ANI of the call to the third-party commercial service, and receive back the expected SPID for that ANI.

When the call lands at the terminating telephony service provider 215b, the called device 214b, or a call center (e.g., call center system 110 of FIG. 1), the device that received the SIP Invite or other call data forwards the SIP Invite to the verification server 202. The verification server 202 then determines whether the call is a spoofed call. The verification server 202 determines whether the SIP Invite includes an identity header, which is a header that carries certificate information (e.g., STIR-SHAKEN information). The verification server 202 then performs various functions to extract and evaluate data values in the identity header and SIP Invite to whether the call was attested level A by a first-party signer.

The verification server 202 may evaluate the SIP Invite identity header for any number of determinations, which the verification server 202 may employ in downstream authentication processes. For example, the verification server 202 may determine whether any telephony service provider 215 (e.g., originating telephony service provider 215a) attested to the call and which level of attestation the call received. As another example, the verification server 202 determines whether a first-party signer attested to the call. The verification server 202 may then confirm, for example, that the first-party signer attested to the call at level A. In another example, the verification server 202 determines whether the SIP Invite or identity header is missing some other bits of information ordinarily used for authentication (e.g., JIP). In such cases, the verification server 202 can authenticate the call because the attestation can serve as a replacement or an additional data point that the verification server 202 references when authenticating the call. In some embodiments, the verification server 202 determines an authentication and/or spoof likelihood based upon the missing fields (e.g., the number of missing fields, the type of missing fields) in the signaling metadata (e.g., SIP header, certificate data).

In some embodiments, the verification service 202 performs additional downstream operations for authenticating the call using the SPID determination discussed above, (e.g., determining that an actual carrier attested to the call). The verification service 202 extracts various types of metadata from the call data and applies one or more machine-learning architectures or other algorithms on the call data to determine a risk score.

In some implementations, the verification server 202 may use the SPID determination as a binary value indicating, for example, match or mismatch, or first-party signer or third-party communication service. For example, if the verification server 202 determines that the attestation in the certificate originated by a first-party signer for first-party attestation, then the verification server 202 may use that binary determination as a data point or weighting factor, which the verification server 202 takes as an input when executing a rules-based analysis engine for accepting or rejection calls, or feeds into layers of a machine-learning architecture executed by the verification server 202 for determining a risk or trust score for the inbound call. Additionally or alternatively, in some implementations, the verification server 202 may use the SPID determination as a particular value indicating, for example, the actual signing party associated with the SPID in the certificate. For example, the verification server 202 may determine whether the attestation in the certificate originated by a first-party telephony service provider 215 or third-party telephony service provider 215, and further determine the identity of the particular telephony service provider 215 based on data received from the certificate authority 217.

For instance, a caller may sign up for an account with a cloud-communication service. Using the caller device 214a, the caller places a call through the cloud-communication service, causing the cloud-computing service to function as the authentication service and the originating telephony service provider 215a. The authentication server 216 of the cloud-communication service attests to the ANI of the caller's caller device 214a as level A, even if the caller spoofed the ANI. Ordinarily, the terminating telephony service provider 215b or verification server 202 would successfully verify the ANI and the call as level A, even if the ANI were spoofed. The verification server 202 would ordinarily determine that the certificate and attestation assigned by the cloud-communication service were adequate. The verification server 202 queries the certificate authority 217 (or other telecommunications information service database) using the purported SPID of the certificate and/or purported ANI (or other identifier) in the SIP header to determine whether the purported SPID or purported ANI is associated with a carrier telephony service provider 215 and determine the identity of the originating telephony service provider 215a that signed the certificate. In this case, the certificate authority 217 returns a message indicating that the SPID or the ANI is associated with the cloud-communication service, rather than an expected carrier (e.g., Verizon®, AT&T®). The verification server 202 then determines whether to verify the ANI and SPID information as a binary determination. The verification server 202 may authenticate the inbound call based directly upon the outcome of this binary SPID-ANI verification determination. Alternatively, the verification server 202 may authenticate the inbound call by feeding this binary SPID-ANI verification determination as an input or weighting value into one or more downstream authentication operations, such as a rules-based algorithm, a machine-learning architecture, or both.

In some cases, the caller may spoof an ANI that is properly associated with another end-user of the same cloud-communication service, in which case the verification server 202 might receive information from the certificate authority 217 indicating that the SPID and ANI are genuine and fully-attested, which could cause the verification server 202 to incorrectly verify a spoofed ANI. To mitigate this potential issue, the verification server 202 may identify the particular originating telephony service provider 215a associated with the SPID in the certificate and assign a weight or score representing the trustworthiness (sometimes called a "reputation score" or the like) of the particular originating telephony service provider 215a associated with the SPID. In such cases, the verification server 202 may execute verification operation, which includes executing a machine-learning architecture for verifying the ANI and the SPID using the reputation score as an input or weight. This verification machine-learning architecture may output a binary SPID-ANI verification determination or a SPID-ANI verification score. Where the output is a SPID-ANI verification score, the verification server 202 authenticates the inbound call based upon whether the SPID-ANI verification score satisfies (or fails to satisfy) a verification threshold. Additionally or alternatively, the verification server 202 authenticates the inbound call by feeding a SPID-ANI verification score as an input or weighting value into downstream authentication operations, such as a rules-based algorithm, a machine-learning architecture, or both.

Figure 3:
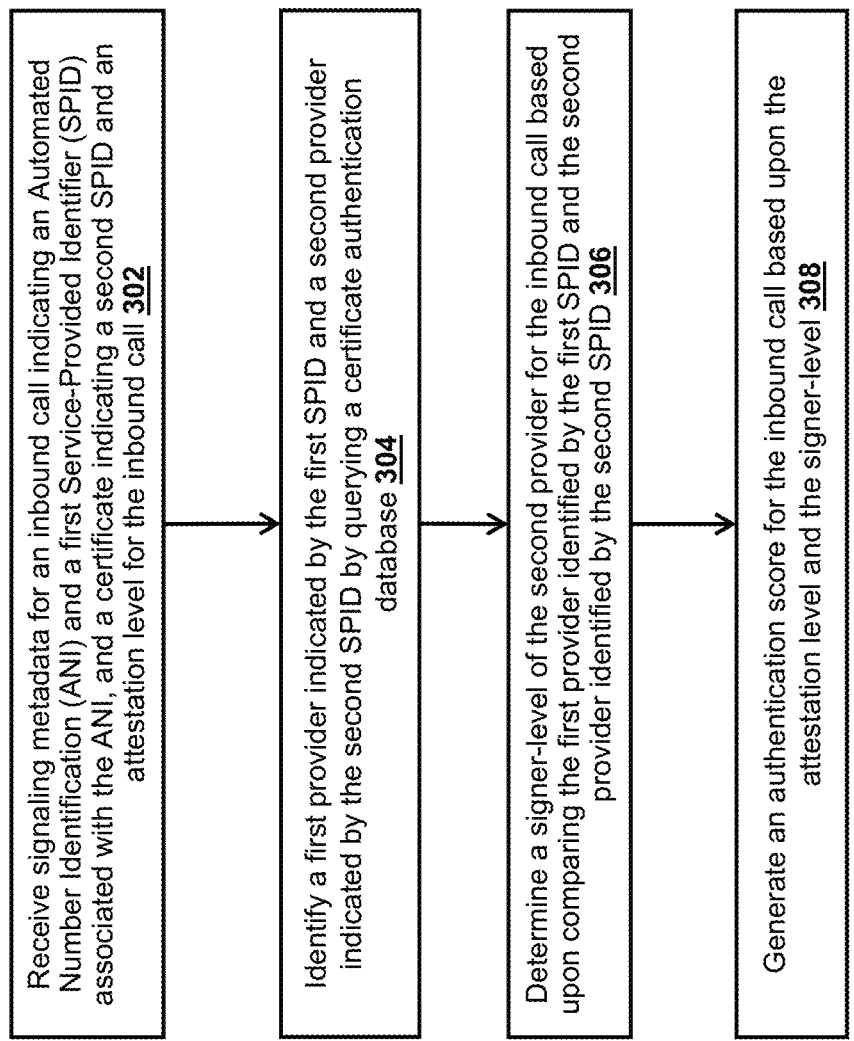
FIG. 3 shows execution steps of a method for authenticating an inbound call according to an embodiment.

FIG. 3 shows execution steps of a method 300 for authenticating an inbound call according to an embodiment. Embodiments may include additional, fewer, or different operations than those described in the method 300. A server performs the steps of the method 300 by executing machine-readable software code that includes one or more layers or functions of a machine-learning architecture, though it should be appreciated that any number of computing devices and/or processors may perform the various operations of the method 300.

In step 302, the server receives call data, such as a signaling metadata, for an inbound call, including an attestation certificate and SIP header data. The call data for the inbound call includes, for example, an Automated Number Identification (ANI), a Service Profile Identifier (SPID) associated with the ANI for the inbound call, and an attestation level for the inbound call. For example, the server receives a SIP invite message for the inbound call having SIP header data that indicates the ANI of the inbound call and the SPID of an originating telecommunications service provider, and the server also receives the certificate for the inbound call having certificate data that indicates the SPID of a signing party (e.g., a telecommunications service provider) and an attestation level assigned to the inbound call by the signing party.

In step 304, the server determines an identity of a first provider indicated by a first SPID in the SIP header data, and determines the identity a second provider indicated by a second SPID in the certificate data. The server may identify the first provider using data fields (e.g., SPID) of the SIP header data that indicate the originating service provider or by querying one or more databases using the data fields or the purported ANI of the SIP header data. The server may identify the second provider indicated by the SPID of the certificate data by querying a certificate authority database or any number of other databases containing SPID data. In some embodiments, the server receives the certificate data "in-band," within the SIP messaging data of the inbound call. Additionally or alternatively, in some embodiments, the server receives the certificate data "out-of-band," via one or more telecom and/or TCP/IP networks from a computer of the signing party or from a computer of an authentication service (e.g., TransNexus®) operating on behalf of the signing party.

In step 306, the server determines a signer-level of the second provider for the inbound call based upon comparing the first provider (identified from the first SPID of the SIP header data) against the second provider (identified from the second SPID of the certificate data). The signer-level indicates the level of relationship between an identifier of inbound call and the signing party. The identifier includes any type of identifying information linking the inbound call with the service provider in the certificate or header data. For example, some jurisdictions (e.g., U.S.A.) require telecommunications systems to associate the ANI and the provider SPID in attestation services, while other jurisdictions (e.g., U.K.) require telecommunications systems to associate another identifier (e.g., billing number, network number) with the provider SPID in attestation services.

The server uses the comparison to determine whether the signing party in the certificate data is a first-party signer or a third-party signer. If the first SPID of the first provider (in the SIP header) and/or the purported ANI (or other identifier) in the SIP header matches or otherwise corresponds to the second SPID of the second provider (in the certificate data), then the server determines that the signing party (in this case, the second SPID) is the first provider and is has a first-party, direct relationship with the purported ANI (or other identifier). But if the first SPID of the first provider (in the SIP header) and/or the purported ANI (or other identifier) in the SIP header does not match or otherwise does not correspond to the second SPID of the second provider (in the certificate data), then the server determines that the signing party (in this case, the second SPID) is not the first provider and is actually a third-party signer (e.g., third-party cloud-communication service) that does not have a direct relationship with the purported ANI (or other identifier).

In step 308, the server generates an authentication score for the inbound call based upon the attestation level and the signer-level. The server determines the authentication score based at least in part on verifying the SPID and ANI information for the inbound call. The server verifies the SPID and ANI information according to the earlier comparison (in step 306) or similar comparative operations in other embodiments. As an example, where the server determines that the signer-level is a first-party signer, then the server successfully verifies the SPID and ANI information. As another example, where the server determines that the signer-level is a first-party signer and that the attestation level is level A, then the server verifies the SPID and ANI information. For instance, if the signer-level is a third-party, then the verification fails regardless of the attestation level; or if the signer-level is first-party and the attestation level is level C, then the verification fails, because the first-party carrier is operating merely as a pass through entity and not position to fully-attest to the ANI (or other identifier) of the inbound call. In some implementations, the server only performs certain SPID verification functions for first-level signers or for signing parties who fully attested to the inbound call. Other embodiments may perform additional or alternative operations for verifying the SPID and ANI information in the SIP header and certificate data.

The authentication score (sometimes referred to as a "risk score" or the like) may be a direct result of the verification operations for verifying the SPID-ANI information. Alternatively, the server may execute one or more authentication operations using the output of the verification operations as an input or weight. The server may generate the authentication score as a binary output indicator or value, or as a value that the server compares against an authentication threshold.

The server may generate one or more additional or alternative scores for the inbound call, such as a SPID-ANI verification score, spoof likelihood score, or reputation score for an entity associated with a SPID. As mentioned, the server may use the verification score as the authentication score in some embodiments. Alternatively, the server may feed these other scores into downstream authentication operations for determining the authentication score or comparing against the authentication score.

The server generates a SPID-ANI verification score by executing a rules-based algorithm or machine-learning architecture to output the verification score as a value or as a binary verification output determined by comparing the verification score against a verification threshold. The server determines the verification score based upon a comparison between the SPIDs and other information in or derived from the SIP header data the certificate data, such as a level of similarity between the information in the SIP header and the certificate data, a reputation score, and the purported attestation level, among other types of data.

The server generates a reputation score for a party by executing a rules-based algorithm or machine-learning architecture to output the reputation score as a value or as a binary reputation output (e.g., trusted, untrustworthy), determined by comparing the reputation score against a reputation threshold or by querying a third-party data source that publishes threat information. The server determines the reputation score based upon behavior information associated with the SPID of the signing party and/or originating telecommunication provider in the SIP header data. The server uses the reputation score as an input or weight for determining other scores, such as the verification score, spoof likelihood score, or authentication score.

The server generates a spoof likelihood score for the ANI, SPID, other identifier of the inbound call by executing a machine-learning architecture (and/or a rules-based algorithm) to output the spoof likelihood score as a value or as a binary spoof likelihood output (e.g., trusted, untrustworthy), determined by comparing the spoof likelihood score against a spoof likelihood threshold. The server determines the spoof likelihood score based upon the various types of signaling metadata in the SIP messages and behavior information associated with the signaling metadata. The server may use the spoof likelihood score as an input or weight for determining the authentication score or may perform one or more comparative functions the compare the spoof likelihood score against the authentication score.

In some embodiments, a computer-implemented method comprises receiving, by a computer, signaling metadata for an inbound call indicating an Automated Number Identification (ANI) and a first Service Profile Identifier (SPID) associated with the ANI, and a certificate indicating a second SPID and an attestation level for the inbound call; identifying, by the computer, a first provider indicated by the first SPID and a second provider indicated by the second SPID by querying a certificate authentication database; determining, by the computer, a signer-level of the second provider for the inbound call based upon comparing the first provider identified by the first SPID and the second provider identified by the second SPID; and generating, by the computer, an authentication score for the inbound call based upon the attestation level and the signer-level.

In some implementations, the method includes authenticating, by the computer, the inbound call in response to determining that the authentication score satisfies an authentication threshold.

In some implementations, the attestation level indicated by the certificate includes at least one of full attestation, partial attestation, and gateway attestation.

In some implementations, the method includes determining, by the computer, that the signer-level is a first-party service provider in response to determining that the first provider identified by the first SPID corresponds to the second provider identified by the second SPID.

In some implementations, the method includes identifying, by the computer, one or more missing signaling data fields in the signaling metadata, wherein the computer determines the authentication score based upon a number of missing signaling fields or a type of a missing signaling data field.

In some implementations, the method includes extracting, by the computer, certificate identity header data as a portion of the signaling metadata, the certificate identity header data including at least one of: the attestation level, the certificate, a calling number, called number, a timestamp, and a unique originating identifier.

In some implementations, the computer receives the signaling metadata of the inbound call via a call center, the signaling data indicating the call center as a call destination of the inbound call.

In some implementations, the method includes generating, by the computer, a spoof likelihood score indicating a likelihood that inbound call is a spoofed call, based upon the signaling metadata. The computer generates the authentication score based upon spoof likelihood score.

In some implementations, the method includes generating, by the computer, a verification score for the second SPID based upon the attestation level and a level of similarity between the signaling metadata associated with the first SPID and the signaling metadata associated with the second SPID. The computer generates the authentication score based upon the verification score.

In some implementations, the method includes generating, by the computer, a reputation score for the second SPID based upon one or more behavior features associated with the second SPID. The computer generates at least one of the authentication score, a verification score, and a spoof likelihood score based upon the reputation score for the second SPID.

In some embodiments, a system comprises a computer coupled to a telecommunications system. The computer comprises a processor configured to receive signaling metadata for an inbound call indicating an Automated Number Identification (ANI) and a first Service Profile Identifier (SPID) associated with the ANI, and a certificate indicating a second SPID and an attestation level for the inbound call; identify a first provider indicated by the first SPID and a second provider indicated by the second SPID by querying a certificate authentication database; determine a signer-level of the second provider for the inbound call based upon comparing the first provider identified by the first SPID and the second provider identified by the second SPID; and generate an authentication score for the inbound call based upon the attestation level and the signer-level.

In some implementations, the computer is further configured to authenticate the inbound call in response to determining that the authentication score satisfies an authentication threshold.

In some implementations, the attestation level indicated by the certificate includes at least one of full attestation, partial attestation, and gateway attestation.

In some implementations, the computer is further configured to determine that the signer-level is a first-party service provider in response to determining that the first provider identified by the first SPID corresponds to the second provider identified by the second SPID.

In some implementations, the computer is further configured to identify one or more missing signaling data fields in the signaling metadata. The computer determines the authentication score based upon a number of missing signaling fields or a type of a missing signaling data field.

In some implementations, the computer is further configured to extract certificate identity header data as a portion of the signaling metadata, the certificate identity header data including at least one of: the attestation level, the certificate, a calling number, called number, a timestamp, and a unique originating identifier.

In some implementations, the computer is configured to receive the signaling metadata of the inbound call via a call center. The signaling data indicates the call center as a call destination of the inbound call.

In some implementations, the computer is further configured to generate a spoof likelihood score indicating a likelihood that inbound call is a spoofed call, based upon the signaling metadata. The computer generates the authentication score based upon spoof likelihood score.

In some implementations, the computer is further configured to generate a verification score for the second SPID based upon the attestation level and a level of similarity between the signaling metadata associated with the first SPID and the signaling metadata associated with the second SPID. The computer generates the authentication score based upon the verification score.

In some implementations, the computer is further configured to generate a reputation score for the second SPID based upon one or more behavior features associated with the second SPID. The computer generates at least one of the authentication score, a verification score, and a spoof likelihood score based upon the reputation score for the second SPID.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, signaling metadata for an inbound call indicating an Automated Number Identification (ANI) and a first Service Profile Identifier (SPID) associated with the ANI, and a certificate indicating a second SPID and an attestation level for the inbound call;
identifying, by the computer, a first provider indicated by the first SPID and a second provider indicated by the second SPID by querying a certificate authentication database;
determining, by the computer, a signer-level of the second provider for the inbound call based upon comparing the first provider identified by the first SPID and the second provider identified by the second SPID; and
generating, by the computer, an authentication score for the inbound call based upon the attestation level and the signer-level.

2. The method according to claim 1, further comprising authenticating, by the computer, the inbound call in response to determining that the authentication score satisfies an authentication threshold.

3. The method according to claim 1, wherein the attestation level indicated by the certificate includes at least one of full attestation, partial attestation, and gateway attestation.

4. The method according to claim 1, further comprising determining, by the computer, that the signer-level is a first-party service provider in response to determining that the first provider identified by the first SPID corresponds to the second provider identified by the second SPID.

5. The method according to claim 1, further comprising identifying, by the computer, one or more missing signaling data fields in the signaling metadata, wherein the computer determines the authentication score based upon a number of missing signaling fields or a type of a missing signaling data field.

6. The method according to claim 1, further comprising extracting, by the computer, certificate identity header data as a portion of the signaling metadata, the certificate identity header data including at least one of: the attestation level, the certificate, a calling number, called number, a timestamp, and a unique originating identifier.

7. The method according to claim 1, wherein the computer receives the signaling metadata of the inbound call via a call center, the signaling data indicating the call center as a call destination of the inbound call.

8. The method according to claim 1, further comprising generating, by the computer, a spoof likelihood score indicating a likelihood that inbound call is a spoofed call, based upon the signaling metadata, wherein the computer generates the authentication score based upon spoof likelihood score.

9. The method according to claim 1, further comprising generating, by the computer, a verification score for the second SPID based upon the attestation level and a level of similarity between the signaling metadata associated with the first SPID and the signaling metadata associated with the second SPID, wherein the computer generates the authentication score based upon the verification score.

10. The method according to claim 1, further comprising generating, by the computer, a reputation score for the second SPID based upon one or more behavior features associated with the second SPID, wherein the computer generates at least one of the authentication score, a verification score, and a spoof likelihood score based upon the reputation score for the second SPID.

11. A system comprising:
a computer coupled to a telecommunications system and comprising a processor configured to:
receive signaling metadata for an inbound call indicating an Automated Number Identification (ANI) and a first Service Profile Identifier (SPID) associated with the ANI, and a certificate indicating a second SPID and an attestation level for the inbound call;
identify a first provider indicated by the first SPID and a second provider indicated by the second SPID by querying a certificate authentication database;
determine a signer-level of the second provider for the inbound call based upon comparing the first provider identified by the first SPID and the second provider identified by the second SPID; and
generate an authentication score for the inbound call based upon the attestation level and the signer-level.

12. The system according to claim 11, wherein the computer is further configured to authenticate the inbound call in response to determining that the authentication score satisfies an authentication threshold.

13. The system according to claim 11, wherein the attestation level indicated by the certificate includes at least one of full attestation, partial attestation, and gateway attestation.

14. The system according to claim 11, wherein the computer is further configured to determine that the signer-level is a first-party service provider in response to determining that the first provider identified by the first SPID corresponds to the second provider identified by the second SPID.

15. The system according to claim 11, wherein the computer is further configured to identify one or more missing signaling data fields in the signaling metadata, wherein the computer determines the authentication score based upon a number of missing signaling fields or a type of a missing signaling data field.

16. The system according to claim 11, wherein the computer is further configured to extract certificate identity header data as a portion of the signaling metadata, the certificate identity header data including at least one of: the attestation level, the certificate, a calling number, called number, a timestamp, and a unique originating identifier.

17. The system according to claim 11, wherein the computer is configured to receive the signaling metadata of the inbound call via a call center, the signaling data indicating the call center as a call destination of the inbound call.

18. The system according to claim 11, wherein the computer is further configured to generate a spoof likelihood score indicating a likelihood that inbound call is a spoofed call, based upon the signaling metadata, wherein the computer generates the authentication score based upon spoof likelihood score.

19. The system according to claim 11, wherein the computer is further configured to generate a verification score for the second SPID based upon the attestation level and a level of similarity between the signaling metadata associated with the first SPID and the signaling metadata associated with the second SPID, wherein the computer generates the authentication score based upon the verification score.

20. The system according to claim 11, wherein the computer is further configured to generate a reputation score for the second SPID based upon one or more behavior features associated with the second SPID, wherein the computer generates at least one of the authentication score, a verification score, and a spoof likelihood score based upon the reputation score for the second SPID.

* * * * *